(12) United States Patent
Pelly et al.

(10) Patent No.: US 7,085,396 B2
(45) Date of Patent: Aug. 1, 2006

(54) EMBEDDING DATA IN MATERIAL

(75) Inventors: Jason Charles Pelly, Reading (GB);
Daniel Tapson, Basingstoke (GB);
Stephen Mark Keating, Reading (GB)

(73) Assignee: Sony United Kingdom Limited, Weybridge (GB)

( * ) Notice: Subject to any disclaimer, the term of this patent is extended or adjusted under 35 U.S.C. 154(b) by 711 days.

(21) Appl. No.: 10/010,026

(22) Filed: Dec. 6, 2001

(65) Prior Publication Data

US 2002/0106105 A1    Aug. 8, 2002

(30) Foreign Application Priority Data

Dec. 7, 2000  (GB) ................... 0029865.3
Dec. 7, 2000  (GB) ................... 0029869.5

(51) Int. Cl.
*G06K 9/00* (2006.01)
(52) U.S. Cl. .................... 382/100; 713/176
(58) Field of Classification Search ........... 382/100; 375/240.19; 713/176; 380/54; 348/465
See application file for complete search history.

(56) References Cited

U.S. PATENT DOCUMENTS

| | | | |
|---|---|---|---|
| 5,636,292 A | 6/1997 | Rhoads | |
| 5,710,834 A | 1/1998 | Rhoads | |
| 5,745,604 A | 4/1998 | Rhoads | |
| 5,748,763 A | 5/1998 | Rhoads | |
| 5,748,783 A | 5/1998 | Rhoads | |
| 5,768,426 A | 6/1998 | Rhoads | |
| 5,822,436 A | 10/1998 | Rhoads | |
| 5,832,119 A | 11/1998 | Rhoads | |
| 5,841,978 A | 11/1998 | Rhoads | |
| 5,848,155 A * | 12/1998 | Cox ................. 382/191 |
| 5,850,481 A | 12/1998 | Rhoads | |
| 5,862,260 A | 1/1999 | Rhoads | |
| 5,930,369 A * | 7/1999 | Cox et al. .............. 380/54 |
| 6,104,826 A * | 8/2000 | Nakagawa et al. ...... 382/100 |
| 6,111,954 A | 8/2000 | Rhoads | |
| 6,122,403 A | 9/2000 | Rhoads | |
| 6,128,736 A * | 10/2000 | Miller ............... 713/176 |

(Continued)

FOREIGN PATENT DOCUMENTS

EP          0961239          12/1999

(Continued)

OTHER PUBLICATIONS

Miller M L et al: "Informed embedding: exploiting image and detector information during watermark insertion" Proceedings International Conference on Image Processing, vol. 3, Sep. 10, 2000, pp. 1-4, XP010529388.

(Continued)

*Primary Examiner*—Joseph Mancuso
*Assistant Examiner*—Craig Kronenthal
(74) *Attorney, Agent, or Firm*—Oblon, Spivak, McClelland, Maier & Neustadt, P.C.

(57) ABSTRACT

A spatial domain using image produced by a source is combined with watermark data Ri to produce a spatial domain watermarked image. The watermarked image is produced by an embedder according to equation: $Ci'=Ci+\alpha \cdot Ri$, where Ci and Ci' are wavelet transform coefficients of the image, and $\alpha$ is a scaling factor. $\alpha$ is chosen so that the watermark is imperceptible in the image and to resist removal of the watermark by unauthorized processing. It is desirable that a has the smallest value which achieves that. If $\alpha$ is too big the watermark is perceptible in the image. If $\alpha$ is too small the mark may not survive processing of the image.

57 Claims, 11 Drawing Sheets

U.S. PATENT DOCUMENTS

| | | | |
|---|---|---|---|
| 6,154,571 A * | 11/2000 | Cox et al. | 382/250 |
| 6,185,312 B1 * | 2/2001 | Nakamura et al. | 382/100 |
| 6,222,932 B1 * | 4/2001 | Rao et al. | 382/100 |
| 6,307,949 B1 * | 10/2001 | Rhoads | 382/100 |
| 6,577,745 B1 * | 6/2003 | Op De Beeck et al. | 382/100 |
| 6,633,652 B1 * | 10/2003 | Donescu | 382/100 |
| 6,674,873 B1 * | 1/2004 | Donescu et al. | 382/100 |
| 6,704,431 B1 * | 3/2004 | Ogawa et al. | 382/100 |
| 6,804,374 B1 * | 10/2004 | Beattie et al. | 382/100 |

FOREIGN PATENT DOCUMENTS

| | | |
|---|---|---|
| EP | 1 043 687 | 10/2000 |
| WO | WO 99-10837 | 3/1999 |

OTHER PUBLICATIONS

Cox I J et al: "Watermarking as Communications with Side Information" Proceedings of the IEEE, IEEE. New York, US, vol. 87, No. 7, Jul. 1999, pp. 1127-1141, XP000914457 ISSN: 0018-9219.

Barni M et al: "Watermark embedding: hiding a signal within a cover image" IEEE Commun. Mag. (USA), IEEE Communications Magazine, Aug. 2001, IEEE, USA, vol. 39, No. 8, Aug. 2001, pp. 102-108, XP002288675 ISSN: 0163-6804.

Wilkinson J H et al: "Tools and Techniques for Globally Unique Content Identification" SMPTE Journal, SMPTE Inc. Scarsdale, N.Y, US, vol. 109, No. 10, Oct. 2000, pp. 795-799, XP000969315 ISSN: 0036-1682.

C. Valens, "*A Really Friendly Guide to Wavelets*", 1999 (c.valens@mindless.com).

SMPTE Journal, *Proposed SMPTE Standard for Television—Unique Material Identifier* (*UMID*), Mar. 2000, pp. 221-225.

TENCON 2000. Proceedings, vol.: 2, 2000, W.N. Cheung "Digital Image Watermarking in Spatial and Transform Domains", p.: 374, 378, vol. 3.

ICIP 98—Proceedings 1998 International Conference on Image Processing, vol.: 2, 1998, H. Inoue, A. Miyazaki, A. Yamamoto, T. Katsura, "A Digital Watermark Based on the Wavelet Transform and its Robustness on Image Compression", pp. 391-395.

ICIP 98—Proceedings 1998 International Conference on Image Processing, vol.: 2, 1998, R. Dugad, K. Ratankonda, N. Ahuja, "A New Wavelet-Based Scheme for Watermarked Images", pp.: 419-423.

Su P-C et al: "Blind Digital Watermarking for Cartoon and Map Images" Proceedings of the SPIE, SPIE, Bellingham, VA, US, vol. 3657, Jan. 25, 1999, pp. 296-306, XP000949150, ISSN: 0277-786X.

Wen-Nung Lie et al: "A Robust image watermarking on the DCT domain" IEEE International Symposium on Circuits and Systems. Emerging Technologies for the 21$^{st}$ Century. IEEE Cat. No. 00CH36353. Presses Polytech. Univ. Romandes Lausanne, Switzerland, vol. 1, May 28, 2000, pp. 228-231, vol. 1, XP002298071, ISBN: 0-7803-5482-6.

Dug-Ryng Kim et al: "A robust data embedding using perceptual adaptive watermark" Circuits and Systems. IEEE APCCAS 1998. The 1998 IEEE ASIA-Pacific Conference on Chiangmai, Thailand. Piscataway, NJ, USA, Nov. 24, 1998, pp. 415-418, XP010319342, ISBN: 0-7803-5146-0.

Dugad R et al: "A scheme for joint watermarking and compression of video" Proceedings International Conference on Image Processing (Cat. No. 00CH37101) IEEE Piscataway, NJ, USA vol. 2, Sep. 10, 2000, pp. 80-83 vol. 2, XP010529928, ISBN: 0-7803-6297-7.

Macq B: "Lossless Multiresolution Transform for Image Authenticating Watermarking" Proceedings of the European Signal Processing Conference, vol. 4, Sep. 8, 2000, pp. 1973-1976, XP008032665.

* cited by examiner

Schematic of wavelet transform

EMBEDDING DATA IN MATERIAL

BACKGROUND OF THE INVENTION

1. Field of the Invention

The present invention relates to embedding data in material.

"Material" as used herein means information material represented by information signals which includes at least one or more of image material, audio material. Image material is generic to still and moving images.

2. Description of the Prior Art

Steganography

Steganography is the embedding of data into material such as video material, audio material and data material in such a way that the data is imperceptible in the material.

Data may be embedded as a watermark in material such as video material, audio material and data material. A watermark may be imperceptible or perceptible in the material.

A watermark may be used for various purposes. It is known to use watermarks for the purpose of protecting the material against, or trace, infringement of the intellectual property rights of the owner(s) of the material. For example a watermark may identify the owner of the material.

Watermarks may be "robust" in that they are difficult to remove from the material. Robust watermarks are useful to trace the provenance of material which is processed in some way either in an attempt to remove the mark or to effect legitimate processing such as video editing or compression for storage and/or transmission. Watermarks may be "fragile" in that they are easily damaged by processing which is useful to detect attempts to remove the mark or process the material.

Visible watermarks are useful to allow e.g. a customer to view an image e.g. over the Internet to determine whether they wish to buy it but without allowing the customer access to the unmarked image they would buy. The watermark degrades the image and the mark is preferably not removable by the customer. Visible watermarks are also used to determine the provenance of the material into which they are embedded.

It is known to embed data in material. It is desirable to do that and allow the data to be removed from the material to avoid degrading the material. It is desirable to minimise any charges to the material needed to embed the data in it to avoid degrading the material. It is known to combine the data with the material, the data being scaled by a scaling factor which is chosen according to desired properties of the data when combined with the material. Those properties include one or more of: concealing the data in the material; making the data perceptible in the material; making the data, when embedded in the material, resistant to processing which, intentionally and unintentionally, removes or damages the embedded data.

SUMMARY OF THE INVENTION

According to a first aspect of the invention, there is provided a method of embedding data in material, the method comprising combining a representation of the material with a function of the data and a scaling factor; wherein the scaling factor is generated as a function of a trial decoding of the material, the trial decoding comprising processing the material to recover data therefrom.

Thus the scaling factor can be chosen on the basis of an estimate of the result of a process (e.g. decoding) which will be performed on the combined material and data in practice so as to increase the likelihood that the data is recoverable from the material.

An embodiment of the first aspect of the invention further comprises the steps of:

combining, as a trial, a representation of the material with a function of the data and a trial scaling factor; and performing, as a trial, a predetermined process on the combined material and data;

wherein the scaling factor is generated as a function of a trial decoding of the processed combined material and data.

Thus the scaling factor can be chosen on the basis of an estimate of the result of a process (e.g. JPEG processing) which could be performed on the combined material and data in practice and which may damage the embedded data, so as to increase the likelihood that the data will not be damaged by such processing.

According to the first aspect of the invention, there is also provided a method of embedding data in material, the method comprising the steps of:

producing transform coefficients $C_i$ representing a transform of the material;

producing a pseudo random symbol sequence (PRSS) having L symbols $P_i$ of values +1 and −1;

calculating the correlation $S=\Sigma C_i.P_i$, for i=1 to i=L; and calculating modified coefficient values $C_i'=C_i+\alpha*P_i$, where $\alpha$ is calculated dependent on S and the value of the data bit to be embedded in the coefficient.

Preferably $$\alpha=(\alpha'+\text{offset})$$

where $\alpha'$+offset is a function of the data bit to be embedded in the coefficient, and the method comprises the step of calculating modified coefficient values $$C_i'=C_i+(\alpha'+\text{offset})*P_i \text{ where}$$

$\alpha'=0$ if S is positive and the data to be concealed is a bit of a first value, $\alpha'=0$ if S is negative and the data to be concealed is a bit of a second value, and otherwise $\alpha'$ is a function of S such that $\Sigma C_i'.P_i$ has the correct sign to represent the bit to be encoded.

It will be noted that the calculation of the correlation $S=\Sigma C_i.P_i$, for i=1 to i=L is a form of trial decoding as in the said first aspect and the scaling factor is chosen in dependence on that correlation.

A further aspect of the invention provides a computer program product arranged to carry out one of the aforesaid methods when run on a computer.

The invention also provides corresponding apparatus in other aspects of the invention.

According to a second aspect of the present invention, there is provided a method of embedding data in material, comprising the steps of:

producing transform coefficients $C_i$ of the material:

comparing the magnitudes of the coefficients with a threshold value T; and producing, from the coefficients $C_i$ and the said data modified, coefficient values $C_i'$ which are modified by respective information symbols of a pseudo random symbol sequence modulated by the said data to be embedded;

wherein the said step of producing modified coefficient values does not use coefficients of magnitude greater than the said threshold T and does not use the corresponding information symbols.

The data is detected at a decoder by correlating a pseudo random symbol sequence with the material in which the data is embedded. The data is represented by the sign of the correlation function. By not using, during embedding, coefficients which have a value greater than the threshold, any changes necessary to alter the coefficients to achieve the appropriate sign of the correlation value to represent a bit of the concealed data are minimised.

According to the second aspect of the present invention, there is also provided a method for detecting data embedded in material, the detecting method comprising receiving transform coefficients of the material;

comparing the magnitudes of the received coefficients with a threshold value T; and correlating, the said coefficients with a respective symbols of a pseudo random symbol sequence to detect the said data, wherein the correlating step does not use coefficients of magnitude greater than the said threshold T and corresponding symbols of the pseudo random symbol sequence.

Thus the detecting method is complementary to the embedding method.

The second aspect of the invention also provides the following a), and b):

a) Apparatus for embedding data in material comprising a transformer for producing transform coefficients Ci of the material;

a comparator for comparing the magnitudes of the coefficients with a threshold value T; and a combiner for producing, from the coefficients Ci and the said data, modified coefficient values Ci' which are modified by respective information symbols of a pseudo random symbol sequence modulated by the said data to be embedded, wherein the combiner does not use coefficients of magnitude greater than the said threshold T and does not use the corresponding information symbols;

b) Apparatus for detecting data embedded in material comprising an input for receiving transform coefficients of the material;

a comparator for comparing the magnitudes of the received coefficients with a threshold T; and a correlator for correlating, the said coefficients with respective symbols of a pseudo random symbol sequence to detect the said data, wherein the correlation does not use coefficients of magnitude greater than the said threshold T and the corresponding symbols of the pseudo random symbol sequence.

Yet further, according to the second aspect of the invention, there is provided a method of detecting data embedded in material, the method comprising;

receiving transform coefficients of the material;

comparing the magnitudes of the received coefficients with a threshold Tclip;

clipping, to a magnitude Tclip, the magnitude of coefficients of magnitude greater than the said threshold Tclip; and correlating the clipped and unclipped coefficients with a pseudo random symbol sequence to detect data embedded in the material.

Yet further, apparatus according of the second aspect for detecting data embedded in material, comprises;

an input for receiving transform coefficients Ci' of the material;

a comparator for comparing the magnitudes of the received coefficients with a threshold Tclip;

means for clipping, to a magnitude Tclip, the magnitude of coefficients of magnitude greater than the said threshold Tclip; and a correlator for correlating the clipped and unclipped coefficients with a pseudo random symbol sequence to detect data embedded in the material.

This further aspect of the invention may involve only the detecting method and operates independently of the embedding method. By clipping large value coefficients to a preset smaller value, such coefficients no longer dominate the value of the correlation function needed to decode the embedded data.

However, preferably, there is provided:

a) A method of embedding data in material, the method comprising receiving transform coefficients Ci representing the material;

comparing the magnitudes of the said transform coefficients Ci with a threshold Tclip;

clipping, to the magnitude Tclip, the magnitudes of those of the coefficients having a magnitude exceeding Tclip to produce clipped coefficients; and producing modified coefficients Ci' of values dependent on a scaling factor and the data to be embedded, and the scaling factor is calculated using the said clipped coefficients and the coefficients Ci of magnitude less than Tclip.

b) Apparatus for embedding data in material, the apparatus comprising:

an input for receiving transform coefficients Ci representing the material;

a comparator for comparing the magnitudes of the said transform coefficients with a threshold Tclip;

a clipper for clipping, to the magnitude Tclip, the magnitudes of those of the coefficients having a magnitude exceeding Tclip; and a processor for producing modified coefficients Ci' of values dependent on a scaling factor and the data to be embedded, and the scaling factor is calculated using the said clipped coefficients and the coefficients Ci of magnitude less than Tclip.

Thus by clipping large value coefficients to a smaller value such coefficients no longer dominate the value of the function used to calculate the scaling factor.

The invention also provides a computer program product arranged to carry out one of the aforesaid methods when run on a computer.

BRIEF DESCRIPTION OF THE DRAWINGS

The above and other objects, features and advantages of the invention will be apparent from the following detailed description of illustrative embodiments which is to be read in connection with the accompanying drawings, in which:

FIGS. 7 to 10A are schematic block diagram of subsystems of the system of FIG. 6;

DESCRIPTION OF THE PREFERRED EMBODIMENTS

Overview

Figure 1:
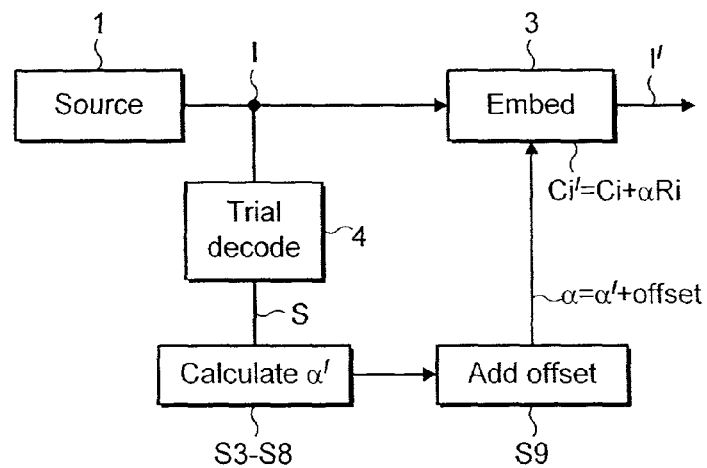
FIG. 1 is a schematic block diagram of an embodiment of a watermarking system according to the present invention.

Referring to FIG. 1, in the shown illustrative watermarking system, a spatial domain image I produced by a source 1 is combined with watermark data Ri to produce a spatial domain watermarked image I'. The watermarked image is produced by an embedder 3 according to the equation $$Ci'=Ci+\alpha.Ri$$

where Ci and Ci' are, for example, wavelet transform coefficients of the image, and $\alpha$ is a parameter which is also referred to herein as a scaling factor. $\alpha$ is chosen in this example so that the watermark is imperceptible in the image and to resist removal of the watermark by unauthorised processing. It is thus desirable that $\alpha$ has the smallest value which achieves that. If $\alpha$ is too big the watermark is perceptible in the image; if it is too small the mark may not survive processing of the image.

In accordance with this embodiment, $\alpha$ is determined from a trial decoding of the original unmarked image I in a decoder 4. The decoding is that which would be used to decode the watermarked image I'. A value $\alpha'$ is produced by a calculator S3–S8, to which an offset value is added by an adder S9 to produce $\alpha$. This produces values of $\alpha$ over the image, which are used to scale the data Ri so as to conceal the data.

Figure 2:
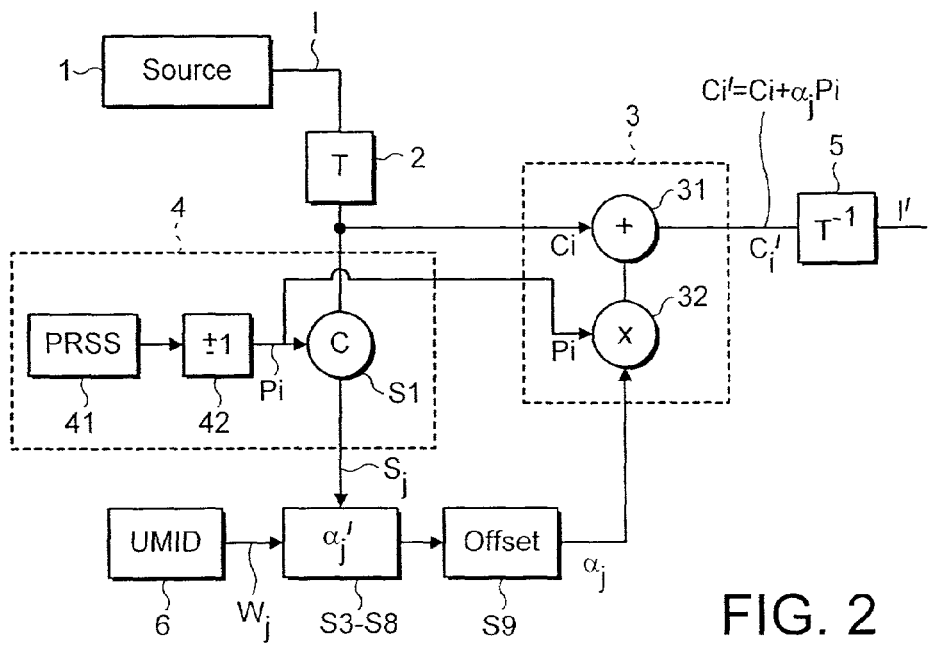
FIG. 2 is a schematic block diagram of another embodiment of a watermarking system according to the present invention.
Figure 6:
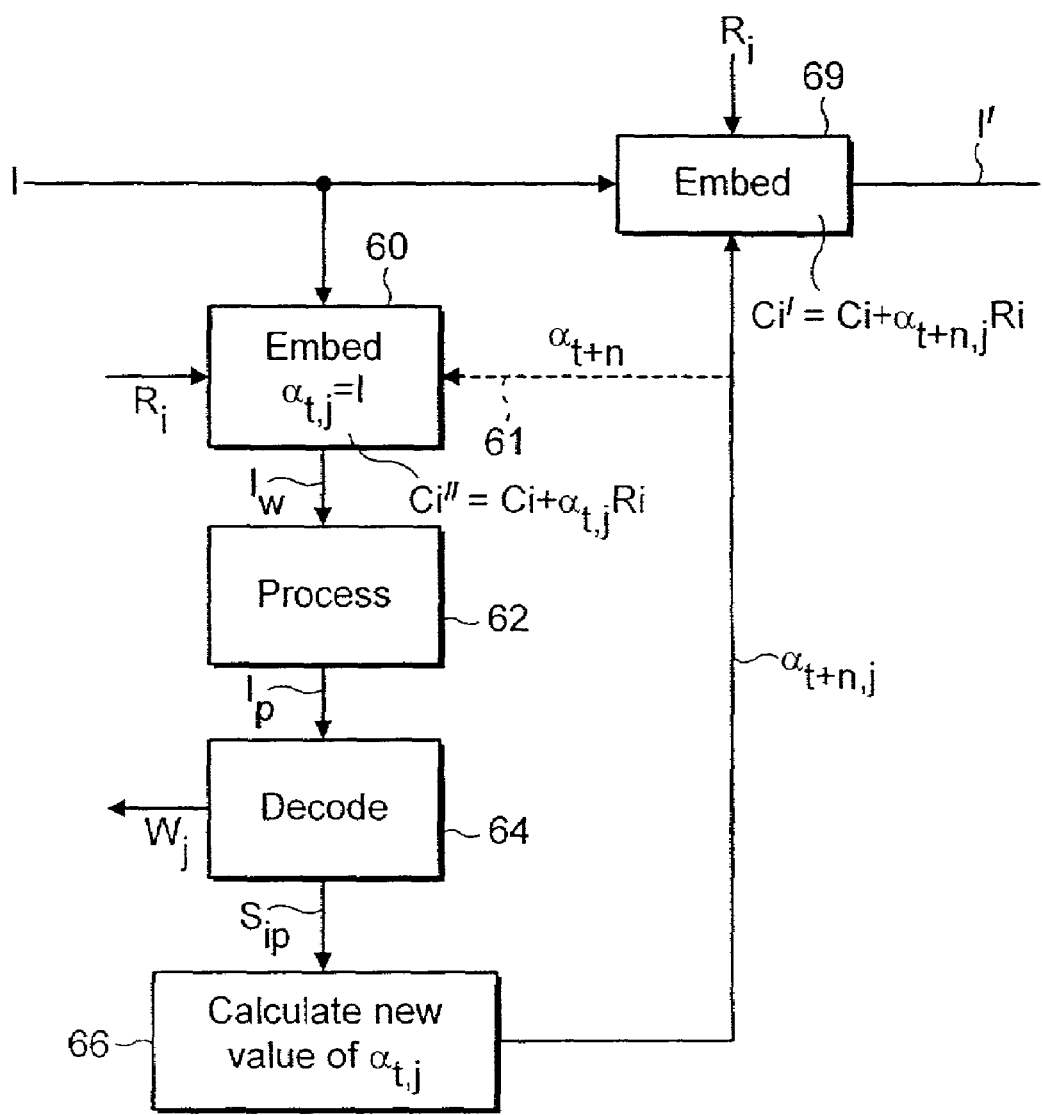
FIG. 6 is a schematic block diagram of a further embodiment of a watermarking system according to the present invention.

FIG. 2 shows an example of the system of FIG. 1 in which the calculation of $\alpha$ also encodes Ri. FIG. 6 shows an example of the system of FIG. 1 in which the trial decoding takes place after a trial processing of the image data by a process which is likely to be applied to the watermarked image.

The data Ri in the examples given below is derived from a UMID. UMIDs are described in the section UMIDs below. As mentioned above, and in the examples given below, the image is subjected to a wavelet transform. Wavelet transforms are briefly discussed in the section Wavelets below.

FIG. 2

Referring to FIG. 2, for the purposes of explanation, it is assumed that the wavelet transform applied to the original spatial domain image results in a transform having four sub-bands of level 1: see the section Wavelets below. For ease of explanation the following description will refer only to the upper horizontal sub-band, but it will be appreciated that the present invention can be applied to any sub-band and may be applied to a plurality of sub-bands. The coefficients of the wavelet transform are denoted by Ci where i is the $i^{th}$ coefficient of a sequence of J×L coefficients where there are J bits of UMID data W1 to WJ. As will become apparent the J×L coefficients correspond to symbols Pi of a Pseudo Random Symbol Sequence PRSS. Each UMID bit is embedded in L wavelet coefficients. Watermark data bit $W_j$ is embedded in coefficients $C_i$ for $i=(j-i)L+1$ to $jL$.

In this example a UMID is produced as the watermark data by a UMID generator 6. In this example the watermark is imperceptible. The data of the UMID is combined with the wavelet coefficients Ci in an embedder 3 in the manner described in detail in the following text. The transformed image together with the watermark Ci' is subjected to an inverse wavelet transform $T^{-1}$, (5) to produce a spatial domain watermarked image I'.

Figure 4:
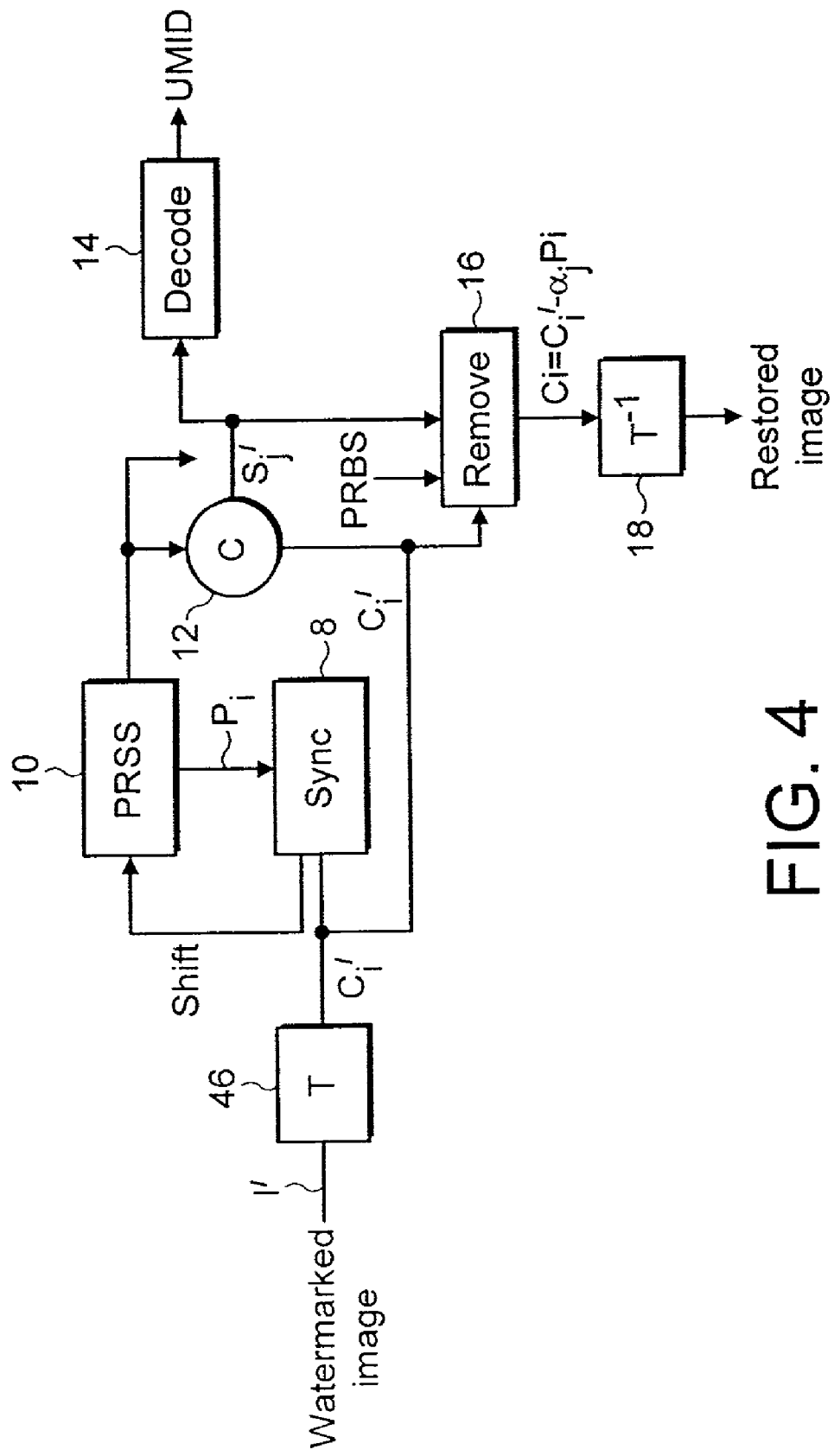
FIG. 4 is a schematic block diagram of an illustrative watermark decoding and removal system.

The watermark is decoded and, optionally, removed from the watermarked image using the illustrative decoding and removal system of FIG. 4.

Trial Decoder 4

Figure 3A:
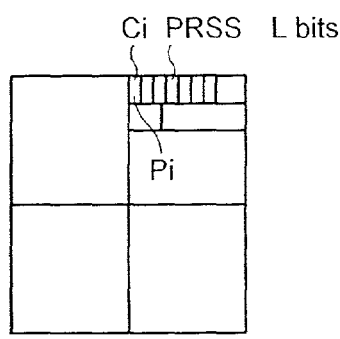
FIG. 3A is a schematic diagram of a wavelet transform showing the relationship of the symbols of a pseudo random symbol sequence to coefficients.

A trial decoder 4 comprises a generator $4_1$ a converter $4_2$, and a correlator S1. The generator $4_1$ produces a pseudo random symbol sequence (PRSS) which is pseudo random because the sequence whilst appearing random can be reliably reproduced. The binary sequence has a length of J×L bits. The converter $4_2$ converts the binary 1 and 0 to +1 and −1 respectively to produce a pseudo random symbol sequence (PRSS) Pi of values +1 and −1. The symbols of the PRSS are denoted herein by Pi, where i denotes the $i^{th}$ symbol of the sequence which is J×L symbols long. The correlator S1 produces correlation values Sj=$\Sigma$Ci.Pi, where the sum is taken over the range $i=(j-1)L+1$ to $jL$ for each of $j=1$ to J. (See FIG. 3A.)

Calculation of $\alpha j$ and Embedding the UMID

There is one strength value $\alpha j$ for each UMID bit Wj.

Figure 3B:
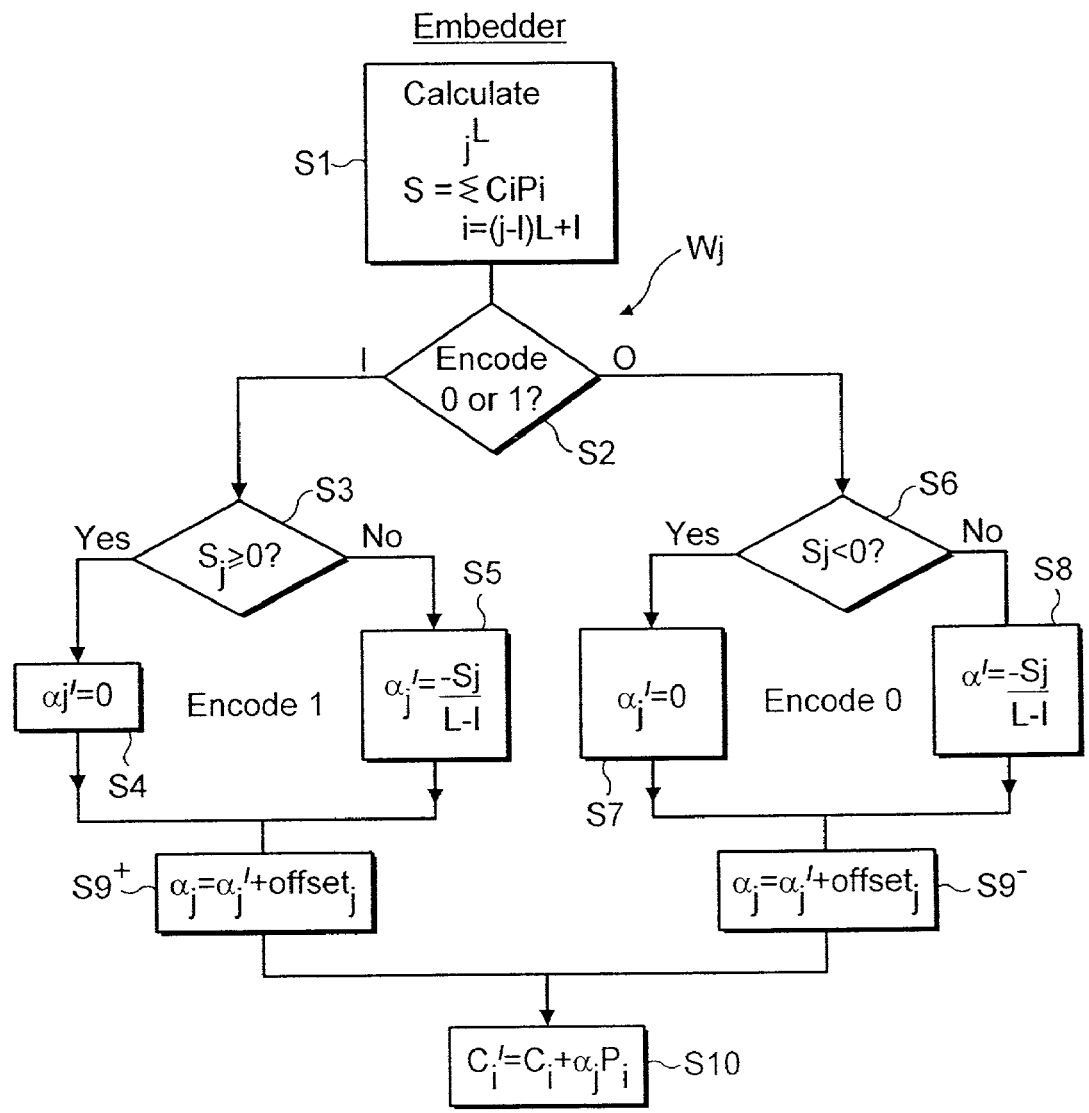
FIG. 3B is a flow diagram of calculations performed by the system of FIG. 2.

The calculation of $\alpha j$ and the embedding of the UMID in the image operates in accordance with the flow diagram of FIG. 3B. The embedder 3 calculates a function $$Ci'=Ci+\alpha jPi \text{ for } i=(j-1)L+1 \text{ to } jL \text{ for each of } j=1 \text{ to } J.$$

where Ci' is an ith wavelet coefficient modified to encoded a bit of watermarking data; and $\alpha j$ is the scaling factor, the value of which depends on:

a) the value 1 or 0 of a bit Wj of the UMID to be encoded in modified coefficient Ci'; and b) the sign of the correlation value Sj=$\Sigma$Ci.Pi, for $i=(j-1)L+1$ to $jL$ for each of $j=1$ to J, produced by the trial decoder 4; and c) the offset value, which is +/−1 in this example, so $\alpha j=\alpha j'+\text{offset}j$.

The principle of operation is that a watermark bit Wj=1 is encoded as a positive correlation value and Wj=0 is encoded as a negative correlation value (or vice versa). $\alpha j$ is chosen to ensure the value of a correlation Sj'=$\Sigma$Ci'.Pi for $i=(j-1)L+1$ to $jL$ for each of $j=1$ to J, performed at the decoder has the correct sign to represent the value of bit Wj. If the correlation Sj performed at the encoder has the correct sign, then $\alpha j'=0$ otherwise $\alpha j'$ is modified to ensure that the correlation Sj'=$\Sigma$Ci'.Pi performed at the decoder has the correct sign.

Thus referring to FIG. 3B:

A value $\alpha j'=\alpha j-$ offsetj.

Step S1 (correlator S1 of FIG. 2) calculates the correlation value Sj=$\Sigma$Ci.Pi, where the sum is taken over the range $i=(j-1)L+1$ to $jL$ for a sequence $i=(j-1)L+1$ to $jL$ of coefficients Ci and PRSS bits Pi. (Note that 'symbols' Pi have values +1 and −1 to ensure that bits of value 0 produced by the generator $4_1$ contribute to the value of Sj.) Step S1 is a trial decoding with a trial value of $\alpha j=0$.

Step S2 determines whether the bit Wj of the UMID generated by generator 6 is 1 or 0. It will be appreciated that the bit Wj is in effect encoded over L coefficients. If Wj=1 then steps S3 to S5 and S9⁺ are followed. These steps are implemented by blocks S3–S8 and S9 in FIG. 2.

Step S3 determines the sign of the correlation Sj. If the sign is positive and the bit Wj is 1 then at step S4 $\alpha j'=0$.

If the sign determined at step S3 is negative but the bit Wj=1 (which should be encoded by Sj positive), then at step S5 $\alpha j'=-Sj/(L-1)$.

At step S9⁺, the offset +1 is added to ensure that $\alpha j$ is positive if Sj=0 and to increase robustness. It should be noted that the offset is a signed value (+1) in this example.

If Wj=0 then steps S6 to S8 and S9⁻ are followed. These steps are implemented by blocks S3–S8 and S9 in FIG. 2.

Step S6 determines the sign of the correlation Sj. If the sign is negative and the bit Wj is 0 then at step S7 $\alpha j'=0$.

If the sign determined at step S6 is positive but the bit Wj=0 (which should be encoded by S negative), then at step S8 $\alpha j'=-Sj/(L-1)$.

At step S9⁻ the offset −1 is added to ensure that $\alpha j$ is negative if Sj=0 and to increase robustness. It should be noted that the offset is a signal value (−1) in this example.

At step S10 the value $Ci'=Ci+\alpha j\, Pi$ is calculated for $i=(j-1)L+1$ to $jL$.

The value $\alpha j'=-Sj/(L-1)$ is an example. The value $\alpha j'$ could be $\alpha j'=-Sj/L$ as another example.

At step S9⁻ an offset of +1 could be subtracted from $\alpha j'$.

Figure 5:
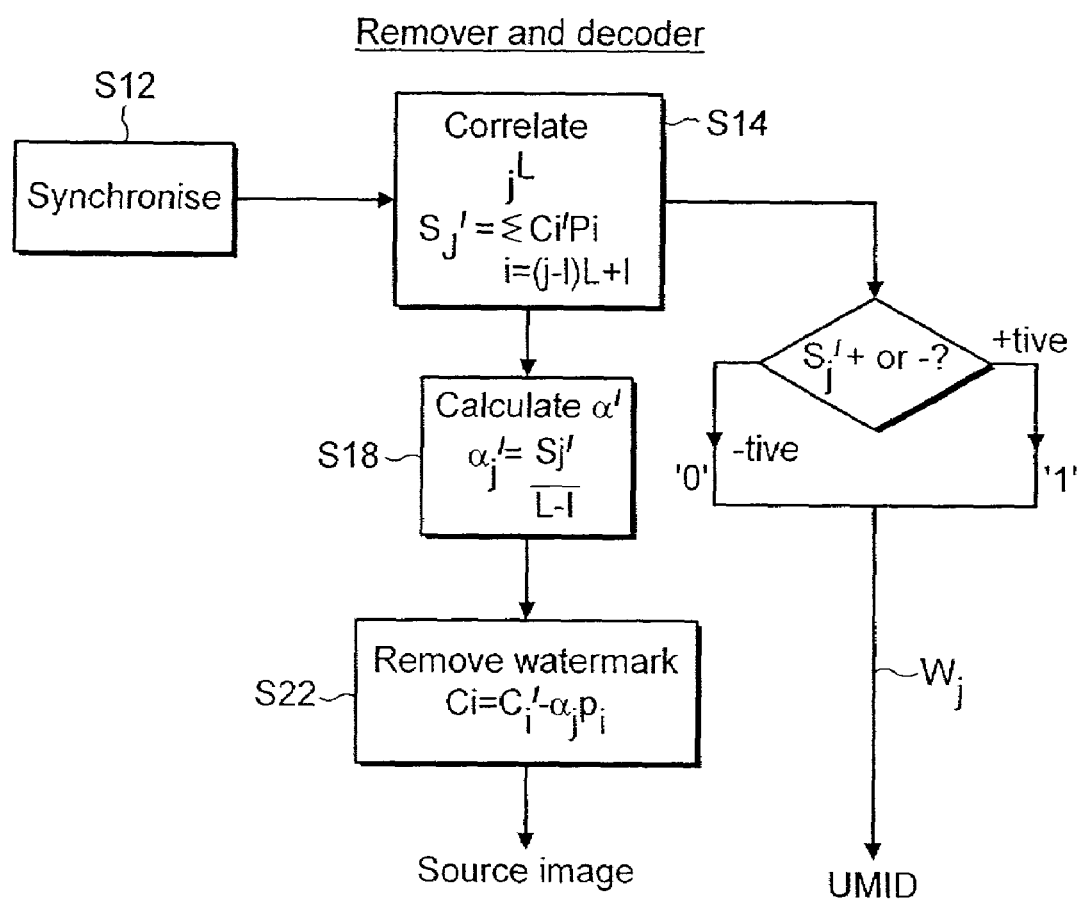
FIG. 5 is a flow diagram of calculations performed by the watermark remover and decoder of FIG. 4.

Watermark Decoding and Removing System (FIGS. 4 and 5)

Referring to FIG. 4, the watermark removing and decoding system has an input for receiving a spatial domain watermarked image I' from the system of FIG. 1. The image may have been subject to image processing (not shown) between production by the system of FIG. 1 and the receipt by the system of FIG. 4.

The received image is transformed by a wavelet transformer 46 (T) to produce wavelet coefficients Ci'. The coefficients Ci' are provided to a synchroniser 8 which correlates the coefficients with a PRSS generated by a generator 10. The synchroniser 8 and the PRSS generator 10 carry out, in known manner, correlations with differing shifts of the PRSS relative to the coefficients to determine the position in the watermarked transformed image of the original PRSS produced at the watermarking system of FIG. 1. Once synchronisation has been achieved the coefficients Ci' are correlated with the PRSS in another correlator 12 to produce the correlation value $$Sj'=\Sigma Ci'.Pi \text{ for } i=(j-1)L+1 \text{ to } jL \text{ for each of } j=1 \text{ to } J.$$

where Pi has values +1 and −1.

The correlation value Sj' is provided to a decoder 14 and to a remover 16, the operations of which will be described with reference to the flow diagram of FIG. 5. The decoder 14 extracts the UMID from the image. The watermark is removed by the remover 16. The resulting restored transformed image is subject to an inverse wavelet transform ($T^{-1}$) in an inverse transformer 18.

Referring to FIG. 5, the synchronisation of the PRSS with the received transformed image occurs at step S12. At step S14, the correlation value $$Sj'=\Sigma Ci'.Pi \text{ for } i=(j-1)L+1 \text{ to } jL.$$

is calculated over a length L of the PRSS.

At step S16, the sign of the value Sj' is determined. If Sj' is negative then the bit of the watermark, (the UMID in this example), is 0. If Sj' is positive the bit of the watermark is 1.

At step S18, $$\alpha j=Sj'/(L-1)$$

is calculated from Sj'. (This calculation may be an approximation because it assumes that $\Sigma Ci.Pi=0$).

At step S22, $Ci=Ci'-\alpha j\, Pi$ is calculated for $i=(j-1)L+1$ to $jL$.

If, in the embedding process, $\alpha j$ is calculated as $$-\frac{Sj}{L}$$

at the step S5 or S8, then in the decoding process $\alpha j'$ is calculated as Sj'/L at step S18.

Figure 11A:
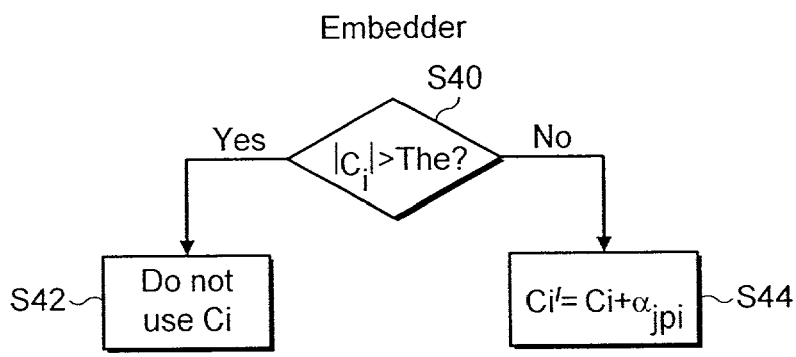
FIG. 11A is a flow diagram of a modification, in accordance with the invention, of the flow diagram of FIG. 3B.
Figure 12:
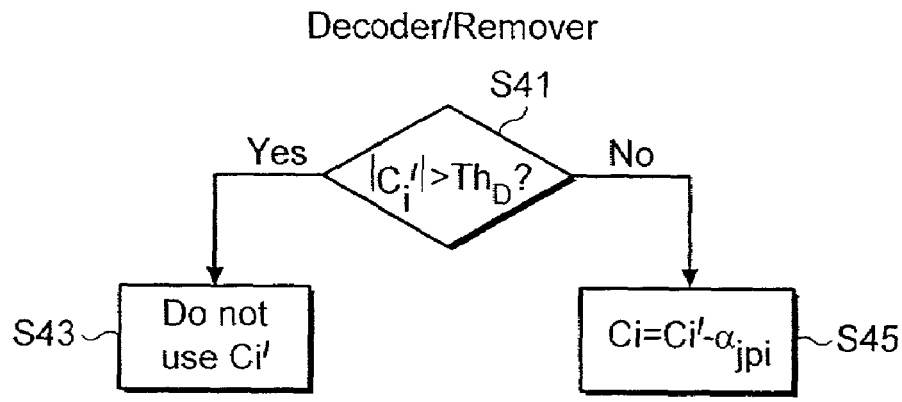
FIG. 12 is a flow diagram of a modification, in accordance with the invention, of the flow diagram of FIG. 5.

Modifications.

a). Threshold on the Values of Ci and Ci' (FIG. 11A, FIG. 12)

In a modification of the embodiment described above, the values of the coefficients Ci are compared (S40) with a threshold value $Th_e$ at the embedder of FIG. 2, and the values of the coefficients Ci' are compared S41 with a threshold value $Th_d$ at the remover 16 of FIG. 4 and also at the decoder 14 of FIG. 4. If the value of a coefficient exceeds the threshold, that coefficient is not used (S42, S43) in establishing the correlation value Sj or Sj'. $Th_e$ and $Th_d$ may be equal, but it has been found that $Th_d$ is preferably greater than $Th_e$.

By way of a simple example, assume that the PRSS has length L=4 and symbols P1 to P4 have values +1, −1, −1, and +1. Then referring to Table 1 three examples are shown.

TABLE 1

|  | P1<br>C1 | P2<br>C2 | P3<br>C3 | P4<br>C4 | Sj, $\alpha j'$<br>Wj = 0 |
| --- | --- | --- | --- | --- | --- |
| Pi | +1 | −1 | −1 | +1 |  |
| Ex1 Ci | −2 | −5 | +1 | −3 | −1, 0 |
| Ex2 Ci | −2 | −25 | +1 | −3 | +19, −19/3 |
| Ex3 Ci | −2 |  | +1 | −3 | −6, 0 |

EXAMPLE 1 (EX1)

The coefficients Ci have values shown. If the value of the bit Wj of the watermark to be encoded is 0 then according to FIG. 3, Sj=−1 and so $\alpha j'=0$.

EXAMPLE 2 (EX2)

However if as shown in example 2 the coefficient C2 has a value −25 than Sj=+19 and $\alpha j'=-19/3$. Large values of $\alpha j'$ may cause the watermark to be perceptible when it should be imperceptible.

EXAMPLE 3 (EX3)

In accordance with an embodiment of the present invention, thresholds $+Th_e$ and $-Th_e$ are set. The magnitude of $Th_e$ may be about 6 for the above example. In practice it is set empirically. Thus as shown in Table 1, the coefficient C2 is not used in the calculation of Sj, and also the corresponding symbol of the PRBS is also not used. As a result Sj=−6 and αj'=0. Thus if the magnitude of a coefficient exceeds the threshold the coefficient is not used.

Now, referring to FIG. 1A, in accordance with this embodiment, the following procedure takes place at the embedder before step S1 of FIG. 3B.

Figure 11B:
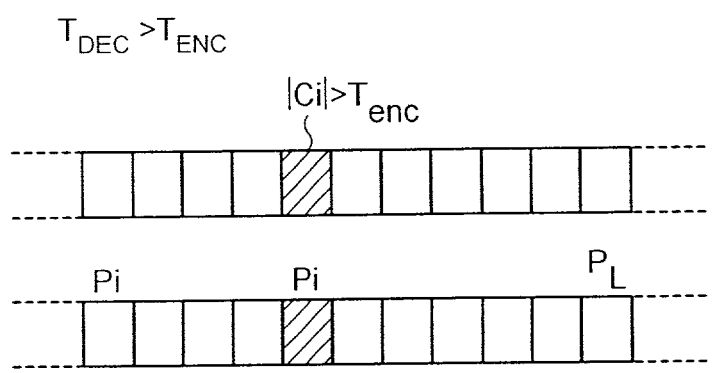
FIG. 11B is a diagram showing the relationship of coefficients $C_I$ and symbols $P_I$ of a pseudo random symbol sequence.
Figure 13:
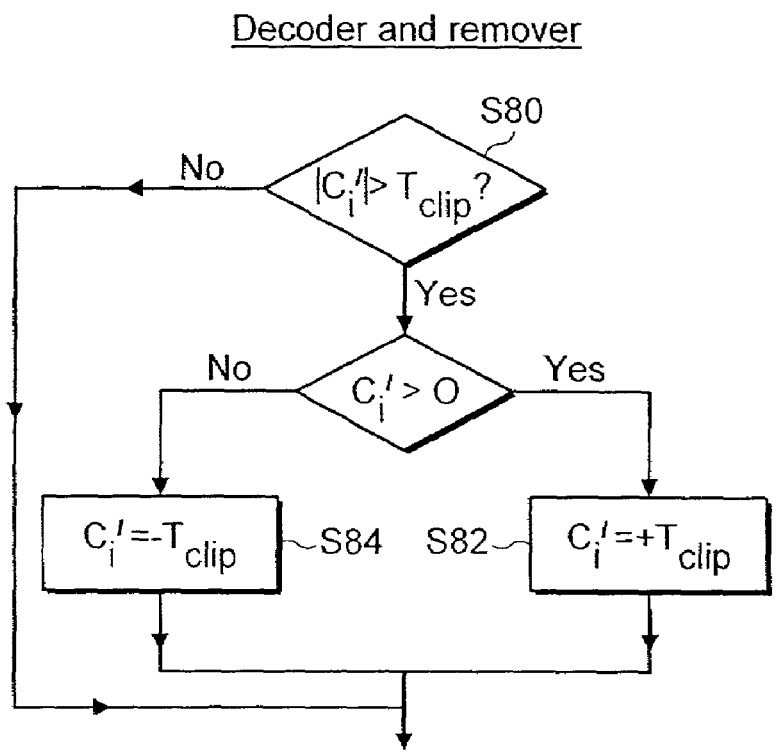
FIG. 13 is a flow diagram of another modification, in accordance with the invention, of the flow diagram of FIG. 5.

At step S40, the magnitude of the coefficient value Ci is compared with the threshold $Th_e$. If the magnitude of Ci is greater than the threshold $Th_e$ then at step S42 Ci is not used. Otherwise at step S44 Ci is used to calculate Ci' as described with reference to FIG. 3B. Referring to FIG. 11B. it will be recalled that each symbol Pi of the PRSS is associated with a coefficient Ci. When a coefficient Ci is not used because it exceeds the threshold, the corresponding symbol Pi generated by the generator 4 is also not used as indicated by the blocks Ci and Pi in FIG. 11B.

b) Clipping Coefficient Values (FIG. 13)

In an alternative modification, the values of the modified coefficients Ci' are clipped at the decoder of FIG. 4 if they exceed (S80) a threshold value of magnitude $Th_{clip}$. Thus coefficient values greater than the threshold are reduced to a predetermined value e.g. $Th_{clip}$. For example referring to Table 1 Example 2, the coefficient C2 (−25) is clipped to say $+Th_{clip}$ e.g. −6 at the decoder. If $C_1 > +T_{clip}$, then $C_1$ is set to $+T_{clip}$ (step S84).

$|T_{clip}|=6$ is only an example and in practice may have other values set by experiment.

Such clipping may or may not be performed also at the embedder of FIG. 2.

In the embedder shown in FIG. 2 it is not performed. However, in another embodiment, the procedure of FIG. 13 may be applied prior to step S1 in FIG. 3B.

The clipping is performed only for the purpose of calculating the parameter $α_j$. The coefficients $C_i$ to which $αj. P_i$ is added do not have clipped values.

Limiting α'

The value of α' may be limited to be within a present range determined by upper and lower bounds.

Trial Processing and Decoding—FIG. 6

Figure 7:
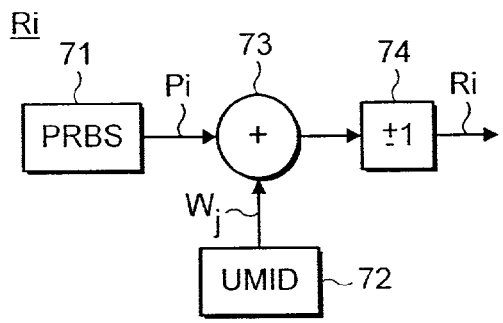
Figure 8:
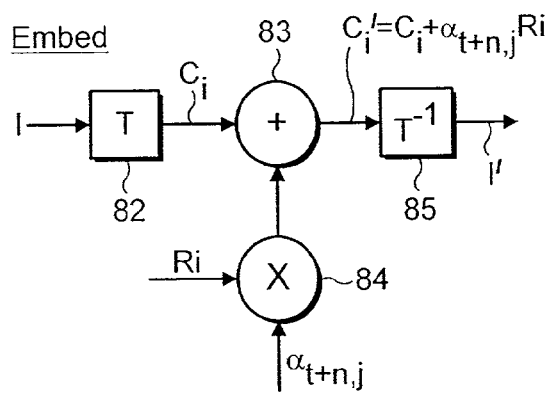

Referring to FIG. 6, an unmarked spatial domain image I is applied to an embedder 60. An example of the embedder is shown in FIG. 8. The embedder calculates $Ci''=Ci+α_{T,j}Ri$ for $i=(j-1)L+1$ to $jL$ for each of $j=1$ to $J$.

where: Ci is a wavelet transform coefficient of the image; Ri is a watermarking symbol formed by combining a PRSS of J×L bits Pi with watermark data Wj. Symbol Ri has a value +or −1; $α_{t,j}$ is a trial value of the scaling factor for UMID (or watermark) data bit Wj. In this example $α_{t,j}$ is initialised to 1. FIG. 7 shows an example of a subsystem, for producing Ri.

The embedder also includes an inverse transformer which produces a spatial domain watermarked image Iw.

The image Iw is processed by a processor 62 to produce a processed spatial domain image Ip. The processor 62 is chosen to process the image according to a process which the watermarked image is likely to encounter in use, and/or a process which may be applied to the image to deliberately remove or damage the watermark. JPEG processing using DCT transforms is a process which is known to be potentially damaging to some watermarks.

Figure 9:
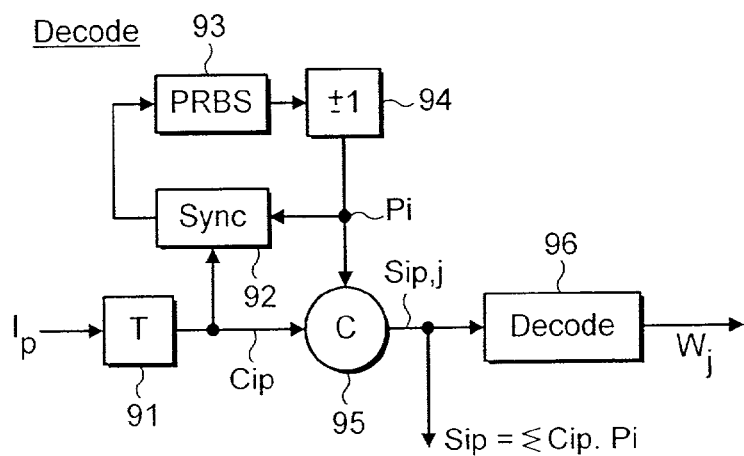

A decoder 64, an example of which is shown in FIG. 9, decodes the processed image Ip. The decoder may extract the watermark data Wj. The decoder produces correlation values $Sip,j'=ΣCip.Pi$ for $i=(j-1)L+1$ to $jL$ for each of $j=1$ to $J$.

where Cip are wavelet coefficients of the processed image Ip and the sum is calculated over a length L of a PRSS having J×L bits Pi.

A calculator 66 calculates a new value of α based on the magnitude of Sip,j to produce new trial values of $α_{t+n,j}$ which is used as a new value in the trial embedder 60. n is the number of iterations used to calculate a final value a which is applied to an embedder 69. n=0,1,2. Several iterations may be used. Preferably the number of iterations is limited to a predetermined number, e.g. 4, because the process 62 may be non-linear (JPEG processing is non-linear) and it is then unlikely that the iterations will converge to steady values of αt,j.

Examples of (a) the calculator 66 and (b) the embedder 69 are shown in FIGS. 10 and 8 respectively.

Calculating Ri, FIG. 7.

A PRSS generator 71 produces a PRSS having J×L bits Pi. A UMID generator 72 produces a UMID having bits Wj. In a modulator 73, each bit Wj of the UMID modulates, and is thus spread over, an L bit sequence of the PRSS. A data converter 74 converts the binary values 1 and 0 at the output of the modulator to produce symbols Ri of value +1 and −1 respectively.

Embedder 60 and 69,—FIG. 8.

The embedder of FIG. 8 comprises a wavelet transformer 82 which produces the wavelet coefficients Ci and an inverse transformer 85. A multiplier 84 calculates $α_{t+n,j}.Ri$. An adder 83 adds $α_{t+n,j}.Ri$ to Ci to produce.

$Ci'=Ci+α_{t+n,j}.Ri$ for $i=(j-1)L+1$ to $jL$ for each of $j=1$ to $J$.

Thus each coefficient Ci is modified by a value of α associated with that coefficient and by one symbol Ri.

Unlike the example of FIGS. 2 and 3, Ri is a symbol stream comprising the PRSS modulated by the data to be embedded, and α is an unsigned magnitude.

Decoder 64—FIG. 9

The decoder has a wavelet transformer 91 which produces wavelet coefficients Cip from the processed image Ip. A synchroniser 92 operating in known manner shifts the phase of the PRSS produced by a PRSS generator 93 so that it is in phase with the PRSS in the image Ip. A data converter 94 converts the PRSS values Pi to +1 and −1.

A correlator calculates a correlation value $Sip,j=ΣCip.Pi$ $i=(j-1)L+1$ to $jL$ for each of $j=1$ to $J$.

A decoder 96 determines the values of the data bits Wj from the sign of the correlation values Sip,j.

Figure 10A:
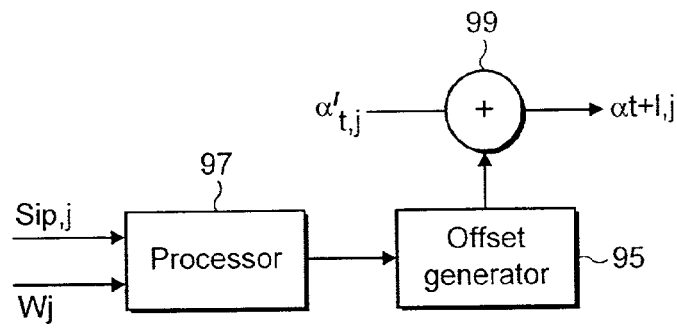
Figure 10B:
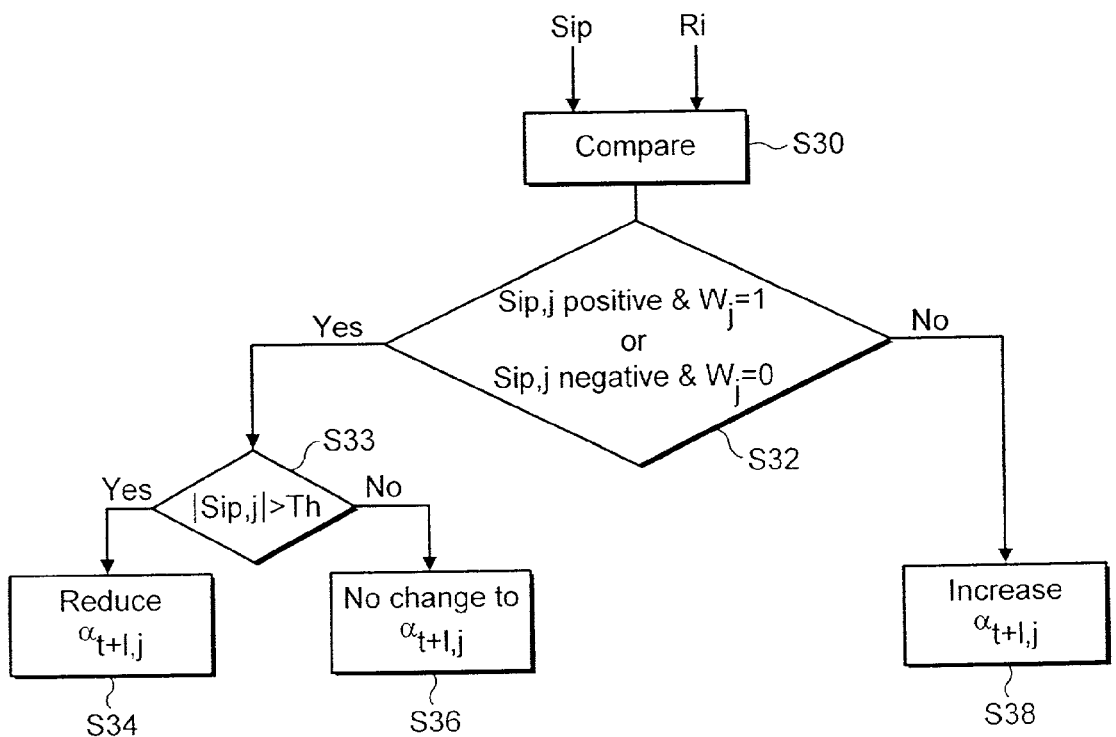
FIGS. 10B and 10C are flow diagrams illustrating a process for calculating $\alpha$.
Figure 10C:
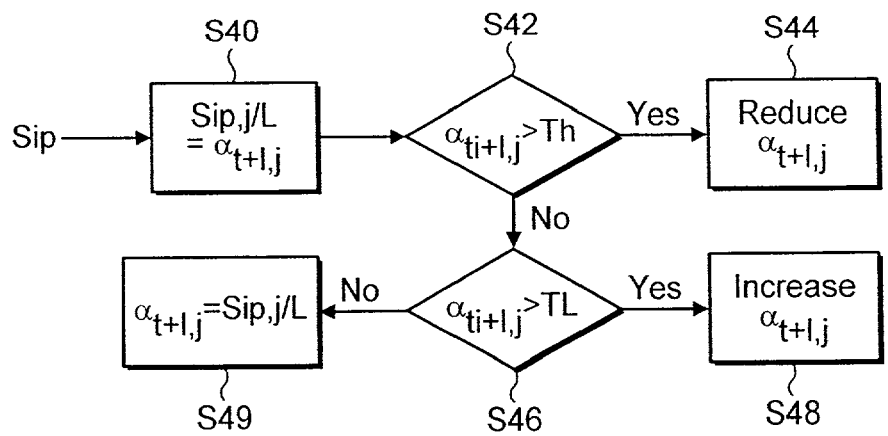

Calculating α—FIGS. 10A, 10B and 10C

Referring to FIG. 10A, new values of $α_{t+1,j}$ are calculated by adding an offset to a basic fixed value $α_{t,j}$ in an adder 99. The offsets are produced by an offset generator 95. The generator responds to an offset control value produced by a processor 97. The processor controls the offset and thus the values of $α_{t+1,j}$ in dependence on the correlation values Sip,j.

FIGS. 10B and 10C illustrate examples of the operation of the processor.

Referring to FIG. 10B, the correlation values Sip,j are compared at step S30 with the corresponding symbols Wj.

The correlation values $Sip,j$ are positive and negative, a positive value indicates a symbol 1 and a negative value a symbol 0, (if the values Sip are unchanged by the processing in processor 62). If the signs of Sip,j correctly represent Wj then the magnitude of Sip,j is compared with an upper threshold Th. If |Sip,j|>Th then the value of αj is reduced for the next iteration $α_{t+1,j}$. If |Sip,j| is not greater than the threshold αj either remains unchanged for the next iteration $α_{t+1,j}$ or is used as the final value of αt,j.

If the sign of Sip,j indicates the incorrect value for Wj, then αj is increased for the next iteration $α_{t+1,j}$.

Referring to FIG. 10C, at step S40 a value (Sip,j)/L is calculated from Sip,j. That is the average correlation value over L symbols. That value is used as $α_{t+1,j}$ for the next iteration. Preferably $α_{t+1,j}$ is compared with an upper threshold Th at step S42. If $α_{t+1,j}$ exceeds Th, then $α_{t+1,j}$ is reduced. Otherwise it is compared (S46) with a lower threshold TL. If $α_{t+1,j}$ is less than TL, $α_{t+1,j}$ is increased (S48) otherwise it is unchanged (S49).

Modifications.

Other Transforms

Whilst the invention has been described by way of example with reference to Wavelet transforms, it may be used with other transforms for example DCT.

Other Material

Whilst the invention has been described by way of example with reference to material comprising images, e.g. video material, it may be applied to other material, for example audio material and data material.

Other Watermark Data.

Whilst the invention has been described by way of example with reference to UMIDs as the watermark data, it may be used with other data as the watermark.

Wavelets

Wavelets are well known and are described in for example "A Really Friendly Guide to Wavelets" by C Valens, 1999 and available at http://perso.wanadoo.fr/polyvalens/clemens/wavelets/wavelets.html.

Valens shows that the discrete wavelet transform can be implemented as an iterated filter bank as used in sub-band coding, with scaling of the image by a factor of 2 at each iteration.

Thus referring to FIG. 12, a spatial domain image is applied to a set of high pass HP and low pass LP filters. At level 1, the first stage of filtering, the image is filtered horizontally and vertically and, in each direction, scaled down by a factor of 2. In level 2, the low pass image from level 1 is filtered and scaled in the same way as in level 1. The filtering and scaling may be repeated in subsequent levels 3 onwards.

The result is shown schematically in FIG. 11. FIG. 11 is a representation normal in the art. At level one the image is spatially filtered into four bands: the lower horizontal and vertical band, $lH_1$, $lV_1$; the upper horizontal band $hH_1$, $lV_1$; the upper vertical band $lH_1$, $hV_1$; and the upper horizontal and vertical band, $hH_1$, $hV_1$. At level 2, the lower horizontal and vertical band, $lH_1$, $lV_1$ is filtered and scaled into the lower horizontal and vertical band, $lH_2$, $lV_2$; the upper horizontal band $hH_2$, $lV_2$; the upper vertical band $lH_2$, $hV_2$; and the upper horizontal and vertical band, $hH_2$, $hV_2$ At level 3 (not shown in FIG. 11), the lower horizontal and vertical band, $lH_2$, $lV_2$ is further filtered and scaled.

UMIDs

The UMID or Unique Material Identifier is described in SMPTE Journal March 2000. Referring to FIG. 13, an extended UMID is shown. It comprises a first set of 32 bytes of basic UMID and a second set of 32 bytes of signature metadata.

The first set of 32 bytes is the basic UMID. The components are:

A 12-byte Universal Label to identify this as a SMPTE UMID. It defines the type of material which the UMID identifies and also defines the methods by which the globally unique Material and locally unique Instance numbers are created.

A 1-byte length value to define the length of the remaining part of the UMID.

A 3-byte Instance number which is used to distinguish between different 'instances' of material with the same Material number.

A 16-byte Material number which is used to identify each clip. Each Material number is the same for related instances of the same material.

The second set of 32 bytes of the signature metadata as a set of packed metadata items used to create an extended UMID. The extended UMID comprises the basic UMID followed immediately by signature metadata which comprises:

An 8-byte time/date code identifying the time and date of the Content Unit creation.

A 12-byte value which defines the spatial co-ordinates at the time of Content Unit creation.

3 groups of 4-byte codes which register the country, organisation and user codes Each component of the basic and extended UMIDs will now be defined in turn.

The 12-byte Universal Label

The first 12 bytes of the UMID provide identification of the UMID by the registered string value defined in table 1.

TABLE 1

Specification of the UMID Universal Label

| Byte No. | Description | Value (hex) |
| --- | --- | --- |
| 1 | Object Identifier | 06h |
| 2 | Label size | 0Ch |
| 3 | Designation: ISO | 2Bh |
| 4 | Designation: SMPTE | 34h |
| 5 | Registry: Dictionaries | 01h |
| 6 | Registry: Metadata Dictionaries | 01h |
| 7 | Standard: Dictionary Number | 01h |
| 8 | Version number | 01h |
| 9 | Class: Identification and location | 01h |
| 10 | Sub-class: Globally Unique Identifiers | 01h |
| 11 | Type: UMID (Picture, Audio, Data, Group) | 01, 02, 03, 04h |
| 12 | Type: Number creation method | XXh |

The hex values in table 1 may be changed: the values given are examples. Also the bytes 1–12 may have designations other than those shown by way of example in the table. Referring to the Table 1, in the example shown byte 4 indicates that bytes 5–12 relate to a data format agreed by SMPTE. Byte 5 indicates that bytes 6 to 10 relate to a "dictionary" data. Byte 6 indicates that such data is "metadata" defined by bytes 7 to 10. Byte 7 indicates the part of the dictionary containing metadata defined by bytes 9 and 10. Byte 10 indicates the version of the dictionary. Byte 9 indicates the class of data and Byte 10 indicates a particular item in the class.

Figure 14:
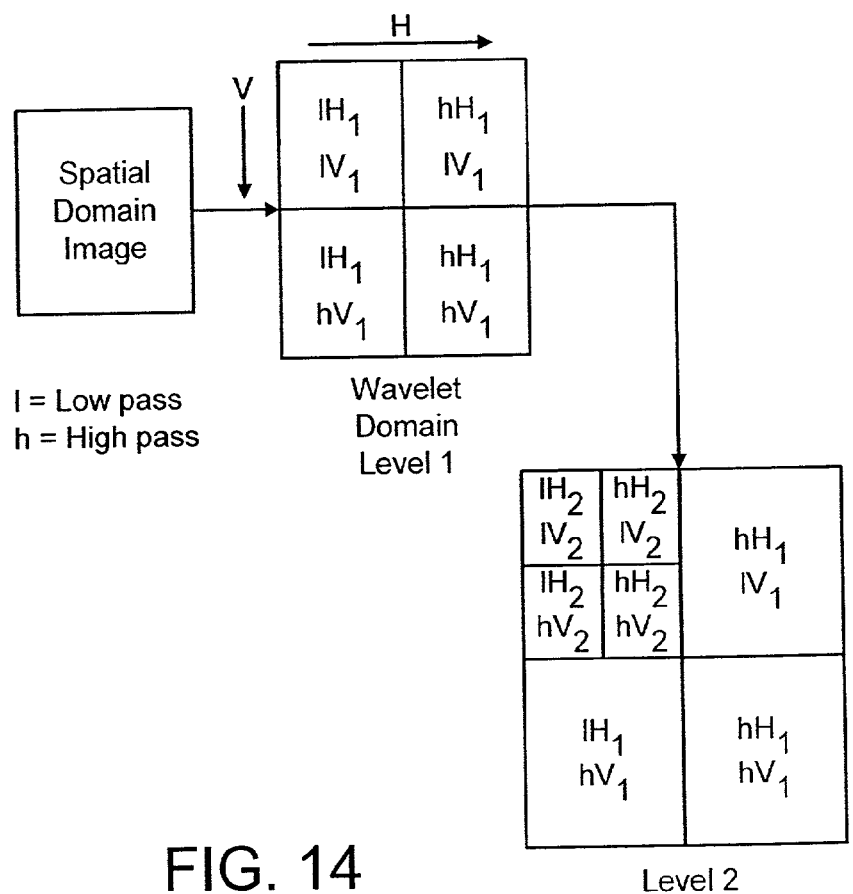
FIGS. 14 and 15 are diagrams explaining wavelet transforms.
Figure 15:
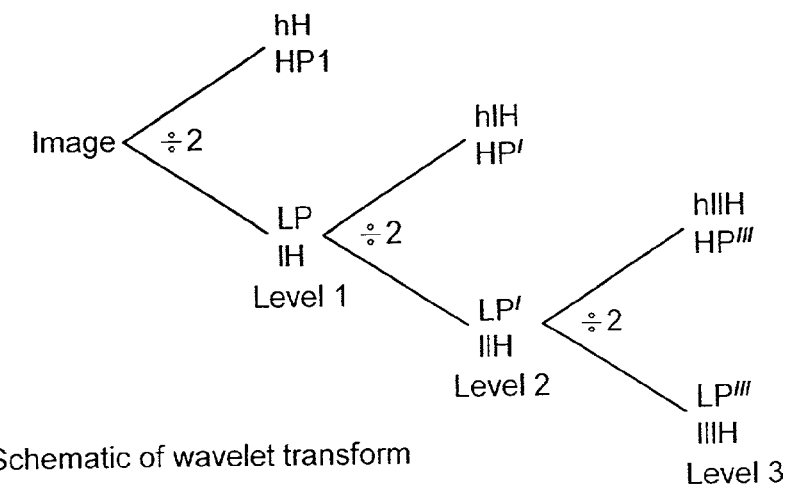
Figure 16:
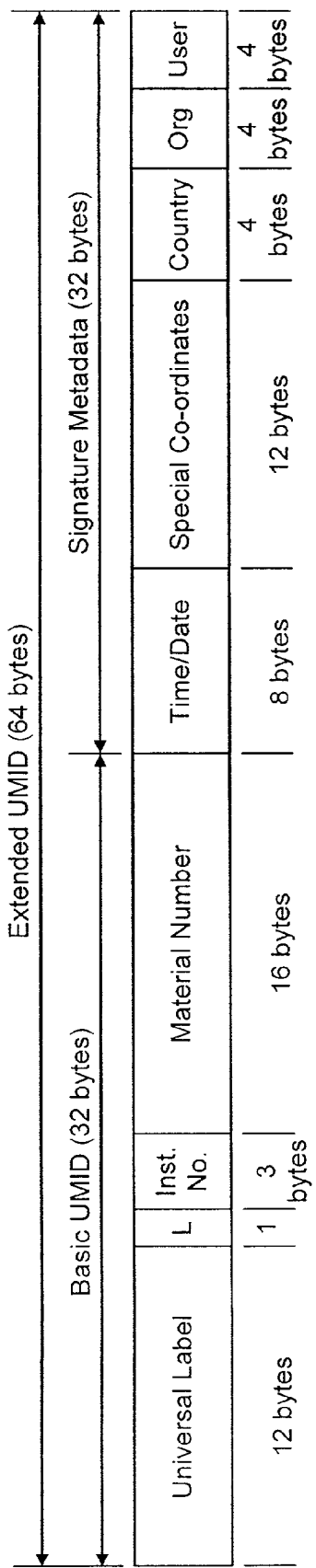
FIGS. 16 and 17 are diagrams showing a UMID and a data reduced UMID.
Figure 17:
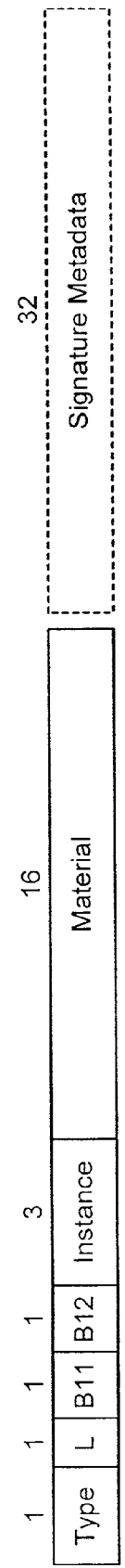

In the present embodiment bytes 1 to 10 have fixed preassigned values. Byte 11 is variable. Thus referring to FIG. 14, and to Table 1 above, it will be noted that the bytes 1 to 10 of the label of the UMID are fixed. Therefore they may be replaced by a 1 byte 'Type' code T representing the bytes 1 to 10. The type code T is followed by a length code L. That is followed by 2 bytes, one of which is byte 11 of Table 1 and the other of which is byte 12 of Table 1, an instance number (3 bytes) and a material number (16 bytes). Optionally, the material number may be followed by the signature metadata of the extended UMID and/or other metadata.

The UMID type (byte 11) has 4 separate values to identify each of 4 different data types as follows:

'01h'=UMID for Picture material
'02h'=UMID for Audio material
'03h'=UMID for Data material
'04h'=UMID for Group material (i.e. a combination of related essence).

The last (12th) byte of the 12 byte label identifies the methods by which the material and instance numbers are created. This byte is divided into top and bottom nibbles where the top nibble defines the method of Material number creation and the bottom nibble defines the method of Instance number creation.

Length

The Length is a 1-byte number with the value '13h' for basic UMIDs and '33h' for extended UMIDs.

Instance Number

The Instance number is a unique 3-byte number which is created by one of several means defined by the standard. It provides the link between a particular 'instance' of a clip and externally associated metadata. Without this instance number, all material could be linked to any instance of the material and its associated metadata.

The creation of a new clip requires the creation of a new Material number together with a zero Instance number. Therefore, a non-zero Instance number indicates that the associated clip is not the source material. An Instance number is primarily used to identify associated metadata related to any particular instance of a clip.

Material Number

The 16-byte Material number is a non-zero number created by one of several means identified in the standard. The number is dependent on a 6-byte registered port ID number, time and a random number generator.

Signature Metadata

Any component from the signature metadata may be null-filled where no meaningful value can be entered. Any null-filled component is wholly null-filled to clearly indicate a downstream decoder that the component is not valid.

The Time-Date Format

The date-time format is 8 bytes where the first 4 bytes are a UTC (Universal Time Code) based time component. The time is defined either by an AES3 32-bit audio sample clock or SMPTE 12M depending on the essence type.

The second 4 bytes define the date based on the Modified Julian Data (MJD) as defined in SMPTE 309M. This counts up to 999,999 days after midnight on the 17th November 1858 and allows dates to the year 4597.

The Spatial Co-ordinate Format

The spatial co-ordinate value consists of three components defined as follows:

Altitude: 8 decimal numbers specifying up to 99,999,999 meters.
Longitude: 8 decimal numbers specifying East/West 180.00000 degrees (5 decimal places active).
Latitude: 8 decimal numbers specifying North/South 90.00000 degrees (5 decimal places active).

The Altitude value is expressed as a value in meters from the centre of the earth thus allowing altitudes below the sea level.

It should be noted that although spatial co-ordinates are static for most clips, this is not true for all cases. Material captured from a moving source such as a camera mounted on a vehicle may show changing spatial co-ordinate values.

Country Code

The Country code is an abbreviated 4-byte alpha-numeric string according to the set defined in ISO 3166. Countries which are not registered can obtain a registered alpha-numeric string from the SMPTE Registration Authority.

Organisation Code

The Organisation code is an abbreviated 4-byte alpha-numeric string registered with SMPTE. Organisation codes have meaning only in relation to their registered Country code so that Organisation codes can have the same value in different countries.

User Code

The User code is a 4-byte alpha-numeric string assigned locally by each organisation and is not globally registered. User codes are defined in relation to their registered Organisation and Country codes so that User codes may have the same value in different organisations and countries.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of embedding data in an information signal representing material, said method comprising the steps of:
producing transform coefficients $C_i$ of the material;
comparing the magnitudes of the coefficients with a threshold value T; and
producing modified coefficient value $C_i'$ by adding an additive offset to the coefficient $C_i$, wherein said offset is an information symbol of a pseudo random symbol sequence modulated by said data to be embedded;
wherein said step of producing modified coefficient values does not use coefficients of magnitude greater than the said threshold T and does not use the corresponding information symbols of the pseudo random symbol sequence, the value of said threshold T being set to reduce a likelihood of any coefficient having a dominant effect on a correlation of the pseudo random symbol sequence and the information signal in which the data has been embedded.

2. A method according to claim 1, wherein the modified coefficients $C_i'=C_i+\alpha P_i$ where $\alpha P_i$ is an information symbol modulated by the data to be embedded, $\alpha$ being a scaling factor.

3. A method according to claim 2, wherein $\alpha$ is dependent on the data.

4. A method according to claim 2, wherein $\alpha$ is of fixed value.

5. A method according to claim 1, wherein the modified coefficients $C_i'=C_i+\alpha R_i$ where $R_i$ is an information symbol $P_i$ modulated by the data, and $\alpha$ is a scaling factor.

6. A method according to claim 1, wherein said transform is a wavelet transform.

7. A method according to claim 1, wherein said transform is a spatial frequency transform.

8. A computer program product embodied in a computer readable medium arranged to carry out the method of 1, when run on a computer.

9. A method according to claim 1, wherein said data comprises a Unique Material Identifier.

10. A method according to claim 1, wherein said material comprises video material.

11. A method according to claim 1, wherein said material comprises audio material.

12. Apparatus for embedding data in an information signal representing material, said apparatus comprising:
    a transformer for producing transform coefficients Ci of the information signal;
    a comparator for comparing the magnitudes of the coefficients with a threshold value T; and
    a combiner for producing modified coefficient value Ci' by adding an additive offset to the coefficient Ci, wherein said offset is an information symbol of a pseudo random symbol sequence modulated by said data to be embedded;
    wherein the combiner does not use coefficients of magnitude greater than said threshold T and does not use the corresponding information symbols of the pseudo random symbol sequence, the value of said threshold T being set to reduce a likelihood of any coefficient having a dominant effect on the correlation of the pseudo random symbol sequence and the information signal in which the data has been embedded.

13. Apparatus according to claim 12, wherein the combiner is arranged to produce modified coefficients Ci'=Ci+α.Pi
    where α.Pi is an information symbol modulated by the data to be embedded, α being a scaling factor.

14. Apparatus according to claim 13, wherein α is dependent on the data.

15. Apparatus according to claim 13, wherein α is of fixed value.

16. Apparatus according to claim 12, wherein the combiner is arranged to produce coefficients Ci'=Ci α.Ri
    where Ri is an information symbol Pi modulated by the data, and α is a scaling factor.

17. Apparatus according to claim 16, said apparatus further comprising:
    a pseudo random sequence generator and a modulator for modulating the pseudo random sequence with said data.

18. Apparatus according to claim 12, wherein said transformer is a wavelet transformer.

19. Apparatus according to claim 12, wherein the said transformer produces a spatial frequency transform of said information signal.

20. A method for detecting data embedded in an information signal representing material, the detecting method comprising:
    receiving transform coefficients of the information signal;
    comparing the magnitudes of the received coefficients with a threshold value T; and
    correlating, said coefficients with respective symbols of a pseudo random symbol sequence to detect said data,
    wherein the correlating step does not use coefficients of magnitude greater than said threshold T and corresponding symbols of the pseudo random symbol sequence.

21. A method according to claim 20, further comprising the step of:
    removing said data from said received coefficients not using coefficients of magnitude greater than said threshold T.

22. A computer program product embodied in a computer readable medium arranged to carry out the method of claim 20 when run on a computer.

23. A method of detecting data embedded in an information signal representing material, the method comprising the steps of:
    receiving transform coefficients of the information signal;
    comparing the magnitudes of the received coefficients with a threshold Tclip;
    clipping, to a magnitude Tclip, the magnitude of coefficients of magnitude greater than said threshold Tclip; and
    correlating the clipped and unclipped coefficients with a pseudo random symbol sequence to detect data embedded in the information signal.

24. A method according to claim 23, further comprising the step of:
    composing removing data from said clipped and unclipped coefficients.

25. A computer program product embodied in a computer readable medium arranged to carry out the method of claim 23 when run on a computer.

26. A method of embedding data in an information signal representing material, said method comprising the steps of:
    producing transform coefficients Ci of the material;
    comparing the magnitudes of the coefficients with a threshold value T; and
    producing, from the coefficients Ci and the said data, modified coefficient values Ci' which are modified by respective information symbols of a pseudo random symbol sequence modulated by the said data to be embedded;
    wherein the said step of producing modified coefficient values does not use coefficients of magnitude greater than the said threshold T and does not use the corresponding information symbols; and detecting the data by
    receiving transform coefficients of the material;
    comparing the magnitudes of the received coefficients with a threshold Tclip;
    clipping, to a magnitude Tclip, the magnitude of coefficients of magnitude greater than the said threshold Tclip; and
    correlating the clipped and unclipped coefficients with a pseudo random symbol sequence to detect data embedded in the material.

27. Apparatus for detecting data embedded in an information signal representing material, the detecting apparatus comprising:
    an input for receiving transform coefficients of an information signal;
    a comparator for comparing the magnitudes of the received coefficients with a threshold T; and
    a correlator for correlating said coefficients with respective symbols of a pseudo random symbol sequence to detect said data,
    wherein the correlation does not use coefficients of magnitude greater than the said threshold T and the corresponding symbols of the pseudo random symbol sequence.

28. Apparatus according to claim 27, further comprising:
a data remover for removing data from the receiving coefficients, the remover omitting coefficients of magnitude greater than said threshold T.

29. Apparatus for detecting data embedded in an information signal representing material, said apparatus comprising:
an input for receiving transform coefficients Ci' of the information signal;
a comparator for comparing the magnitudes of the received coefficients with a threshold Tclip;
a clipper for clipping, to a magnitude Tclip, the magnitude of coefficients of magnitude greater than said threshold T; and
a correlator for correlating the clipped and unclipped coefficients with a pseudo random symbol sequence to detect data embedded in the information signal.

30. Apparatus according to claim 29, further comprising:
a remover for removing data from the clipped and unclipped coefficients.

31. A system including an embedding apparatus, said system comprising:
a transformer for producing transform coefficients Ci of an information signal representing material,
a comparator for comparing the magnitudes of the coefficients with a threshold value T, and
a combiner for producing, from the coefficients Ci and the said data, modified coefficient values Ci' which are modified by respective information symbols of a pseudo random symbol sequence modulated by the said data to be embedded, wherein the combiner does not use coefficients of magnitude greater than the said threshold T and does not use the corresponding information symbols; and detecting apparatus comprising:
an input for receiving transform coefficients of the material;
a comparator for comparing the magnitudes of the received coefficients with a threshold T; and
a correlator for correlating the said coefficients with respective symbols of a pseudo random symbol sequence to detect the said data, wherein the correlation does not use coefficients of magnitude greater than the said threshold T and the corresponding symbols of the pseudo random symbol sequence.

32. A method of embedding data in an information signal representing material, the method comprising the steps of:
producing transform coefficients $C_i$ representing a transform of the information signal;
producing a pseudo random symbol stream having L symbols $P_i$, the pseudo random symbol stream comprising symbol values of +1 or −1;
calculating a correlation value $S=\Sigma C_i * P_i$ for i=1 to L; and
calculating modified coefficient values $C_i'=Ci+\alpha*Pi$, where α is calculated dependent on the value of S being positive or negative to identify a corresponding binary value of the data symbol being embedded.

33. A method according to claim 32 wherein α=(α'+ offset)
where α'+offset is a function of the data bit to be embedded in the coefficient,
α'=0 if S is positive and the data to be embedded is a symbol of a first value,
α'=0 if S is negative and the data to be embedded is a symbol of a second value, and
otherwise α is a function of S such that ΣCi' Pi has the correct sign to represent the symbol to be embedded.

34. A method according to claim 33, wherein
the first value is "1" and the second value is "0".

35. A method according to claim 33, wherein the said function of S is α'=−S/(L−1) or α'=−S/L.

36. A method according to claim 33, wherein the magnitude of the offset is greater than or equal to zero.

37. A method according to claim 36, wherein
the magnitude of the offset is one.

38. A method according to claim 32, wherein
said coefficients are coefficients of a wavelet transform of the information signal.

39. A method according to claim 32, wherein the data to be embedded includes a Unique Material Identifier (UMID).

40. A method of removing data from an information signal representing material, which data has been embedded by the method of claim 32, the method comprising the steps of:
calculating the correlation S'=E Ci'*Pi for i=1 to L, where Pi are the bits of the Pseudo Random Symbol Sequence (PRSS) and have values +1 and −1;
calculating $\alpha_r$ as a function of S'; and
calculating Ci=Ci'−$\alpha_r$.Pi to recover the unmodified coefficients Ci.

41. A method according to claim 40, wherein $\alpha_r=S'/(L-1)$ or $\alpha_r=(S'/L)$.

42. A method according to claim 40, further comprising the step of:
deriving the symbols of the embedded data from S', where if S' is positive a symbol is of the first value and if S' is negative a symbol is of the second value.

43. A method according to claim 40, further comprising the step of:
generating and synchronizing a reference pseudo random symbol sequence with the pseudo random symbol sequence of the embedded data.

44. A computer program product embodied in a computer readable medium arranged to carry out the method of claim 32, when run on a computer.

45. A computer program product embodied in a computer readable medium arranged to carry out the method of claim 32 when run on a computer.

46. An apparatus for embedding data in an information signal representing material, the apparatus comprising:
a transformer for producing transform coefficients $C_i$ representing a transform of the information signal;
a generator for producing a pseudo random symbol stream having L symbols $P_i$, the pseudo random symbol stream comprising symbol values of +1 or −1;
an input for receiving symbols of the data to be embedded; and
a data embedder arranged to calculate a correlation value $S=\Sigma C_i * P_i$ for i=1 to L; and
to calculate modified coefficient values $C_i'=Ci+\alpha*Pi$, where α is calculated dependent on the value of S being positive or negative to identify a corresponding binary value of the data symbol being embedded.

47. Apparatus according to claim 46 wherein

α=(α'+offset)

where α' offset is a function of the data bit to be embedded in the coefficient, and the apparatus is arranged to
calculate modified coefficient values Ci'=Ci+(α'+offset)*Pi where
α'=0 if S is positive and the data to be embedded is a bit of a first value,
α'=0 if S is negative and the data to be embedded is a bit of a second value, and otherwise α' is a function of S such that ΣCi'.Pi has the correct sign to represent the bit to be embedded.

48. Apparatus according to claim 47, wherein the first value is "1" and the second value is "0".

49. Apparatus according to claim 47, wherein $$\alpha = -S/(L-1) \text{ or } -S/L.$$

50. Apparatus according to claim 47, wherein the offset is greater than or equal to zero.

51. Apparatus according to claim 50 wherein the offset=1.

52. Apparatus according to claim 46, wherein the coefficients are coefficients of a wavelet transform of the material information signal.

53. Apparatus according to claim 52, wherein $\alpha_r = S/(L-1)$ or $(S/L)$.

54. Apparatus according to claim 46, further comprising: a generator for generating a Unique Material Identifier (UMID) as said data to be embedded.

55. Apparatus for removing data from an information signal representing material, which data has been embedded by the apparatus of claim 46, the apparatus comprising:

a generator for generating a Pseudo Random Symbol Sequence (PRSS); and a calculator for calculating, the correlation $S' = \Sigma Ci'.Pi$ for i=1 to L where Pi are the bits of the PRSS, a value $\alpha_r$, dependent on S', and a coefficient value $Ci = Ci' - \alpha_r.Pi$ to recover the unmodified coefficients Ci.

56. Apparatus according to claim 55, further comprising:

a decoder for deriving the bits of the embedded data from the correlation value S', where if S' is positive a bit of the data has a first value and if S' is negative a bit of the data has a second value.

57. Apparatus according to claim 55, further comprising a synchronizer for synchronizing the generated PRSS Pseudo Random Symbol Sequence (PRSS) with the PRSS of the embedded data.

* * * * *